J. A. Bostwick,
Oil Can Filler.
No. 104,414. Patented June 21, 1870.
Fig: 1.
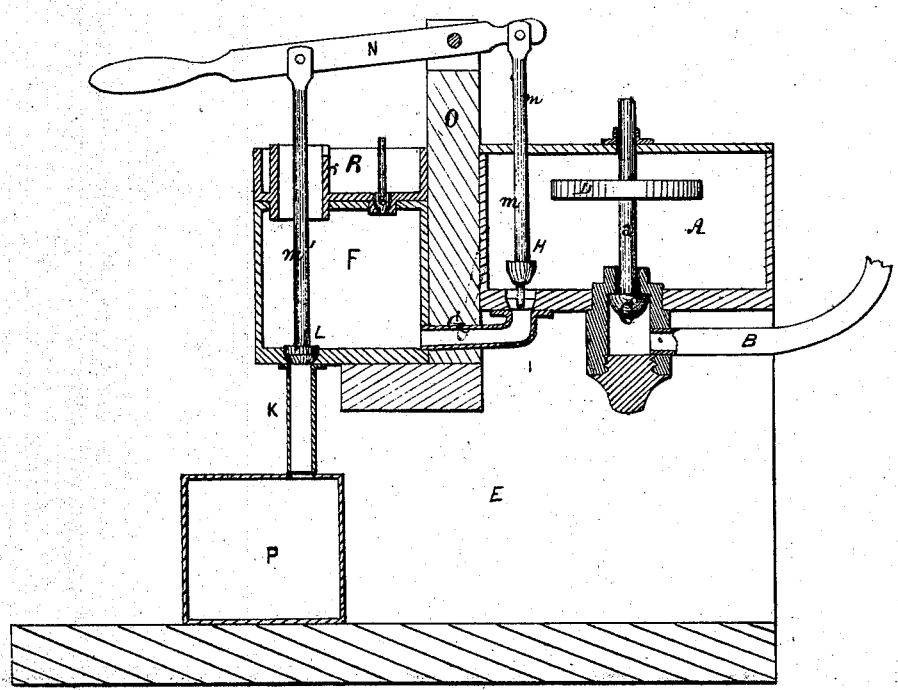
Fig: 2.
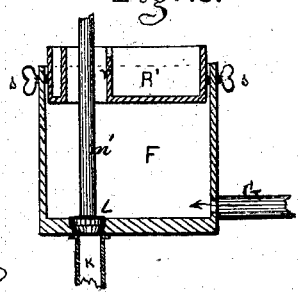
Witnesses
H. H. Young
C. C. Wilson
Jabez A. Bostwick
Inventor
By David A. Burr, atty.

United States Patent Office.

JABEZ A. BOSTWICK, OF NEW YORK, N. Y.

Letters Patent No. 104,414, dated June 21, 1870.

IMPROVEMENT IN APPARATUS FOR FILLING OIL-CANS.

The Schedule referred to in these Letters Patent and making part of the same.

I, JABEZ A. BOSTWICK, of New York city, in the county and State of New York, have invented a new and useful Apparatus for Filling Oil-Cans and other Vessels from Tanks, of which the following is a specification.

My invention relates to a novel combination of a measuring-vessel from and by which the cans are to be filled, with a supply-tank interposed between the same and the main reservoir, the two being placed upon the same, or nearly the same, level, and the tank provided with a float-valve to limit the extreme height of liquid therein to the level of the top of the measure, so that, when the pipe connecting the two is opened, the measure will be automatically filled to its full capacity, without overflowing.

It relates also to the combination of an overflow-pan with the top of the measure, whereby any excess of liquid, escaping from the measure, is collected, saved, and returned thereto.

The object of my invention is to facilitate the rapid filling of a number of cans or other vessels, each with an exact fixed measure of liquid, drawn from a quantity thereof stored in bulk.

Figure 1, in the accompanying drawing, is a central vertical section of my apparatus, illustrating its construction, and the arrangement and combination of its several parts, and Figure 2 is a detached view illustrating a modification in the measure.

A, in the accompanying drawing, is a supply-tank, constructed of wood or metal, placed upon a suitable frame-work or base, E. It is made to communicate, by means of a pipe, B, directly with the main reservoir wherein the liquid is stored in bulk.

A valve, C, connected by a rod or chain, a, with a float, D, covers the end of the pipe B, and closes the same when the tank is full.

By the operation of the float D and valve C, (these may be of any approved form,) the tank A is always kept filled to a proper height without overflowing.

F is the measuring vessel or filler, made of wood or metal, of a capacity equal to the largest quantity of liquid to be delivered from the apparatus at one filling. This measure F is placed upon the supporting frame-work E, along side or in front of the supply-tank A, so that the top of each shall be upon the same, or nearly the same, level, and communication is established between the two by means of a pipe, G, opening into the bottom of the tank A, and into the side of the measure F near the bottom thereof, the bottom of the latter being so placed for this purpose as to be below the level of the former.

The mouth of this pipe G, in the bottom of the supply-tank A, is closed by means of a valve, H, as illustrated in this drawing.

An opening is also made in the bottom of the measure F, and is fitted with a discharge-pipe, K, made long enough to reach the cans to be filled. This outlet-opening is likewise closed with a valve, L, similar to that closing the mouth of the pipe G, and these two valves are each connected, by means of suitable links $m$ $m'$, to either end of a lever, N, pivoted to the upper end of an intermediate standard or support, O.

Hence, when the lever is inclined downward toward the measure F, the valve L will close the orifice opening into the pipe K, and thus prevent any escape of liquid from the vessel, while the elevation of its opposite end will lift the valve H, and open the pipe G, so that the filler F will be quickly filled from the supply-tank A. A reverse movement of the lever will close the valve H, and thus shut off communication with the supply-tank, and simultaneously open the valve L, and allow the contents of the measure F to flow through the pipe K into the can or other vessel P, placed beneath it to be filled.

The pipe K may be made extensible, so as to accommodate itself to different heights of vessels.

The float D, controlling the induction-valve C of the supply-tank A, is so adjusted as that the height of liquid in said tank shall not exceed the level of the top of the measure F, so that, when the communicating pipe G, between the two, is open, the measure will be completely filled by the gravitation of the liquid, but without overflowing, for, so soon as it is filled, the flow thereinto will cease, from the simple fact that the liquid in both vessels will have attained the same level.

To guard, however, against a possibility of overflow from accidental or other causes, and to catch and save so much of the liquid as may be forced up through the opening in the top of the measure through which the valve-rod or link $m'$ plays, I place or form a pan, R, upon the top of said measure, with a rim extending entirely above the level of the top of the tank A. I also encircle the opening through which the valve-rod $m'$ plays, with a rim or collar, $r$, of nearly the same height, so that any liquid overflowing from any cause, up through said opening, will pass into the pan R and be there retained.

A valve, S, closes an opening in the bottom of the pan, through which the liquid in the pan may be returned to the measure. If found desirable, this valve may be so connected with the lever N, as that when, by its movement, the discharge-pipe K of the measure is closed and the measure is being filled, the valve S will be opened to permit the contents of the pan to pass into the measure.

The capacity of the measure to receive and deliver any quantity less than the maximum may be determined by placing therein solid bodies or weights, which shall serve to displace the excess of liquid and reduce the capacity of the measure to the extent desired.

I also purpose to construct the measure F with an open top, as illustrated in fig. 2, and to make the overflow-pan R' of such diameter as to fit and slide, with a very close joint, within the measure F, so as to be raised and lowered therein, and thus serve to regulate its capacity, and, at the same time, receive the overflow in same manner as when made stationary, as shown in fig. 1. It is secured at any desired height by means of set-screws $s\ s$, or levers or other mechanical devices.

I claim as my invention—

1. The combination, with a measuring-vessel, F, of a tank, A, interposed between said vessel and the main reservoir, when said tank is provided with an automatic float-actuated valve, C, to determine its contents, and so placed relatively to the measuring-vessel as that the surface of the liquid in the two vessels, when full, shall be upon the same level, and the supply to the measure will be consequently checked when it is filled, by the simple operation of the valve in the tank, all substantially as herein set forth.

2. An overflow-pan or receptacle, R, in combination with the top of a measuring-vessel, F, when said measuring-vessel is connected to and supplied from a separate tank or reservoir, substantially as herein set forth.

J. A. BOSTWICK.

Witnesses:
JOHN B. TILFORD, Jr.,
Y. H. TILFORD.